United States Patent [19]

Shimada et al.

[11] Patent Number: 4,989,476

[45] Date of Patent: Feb. 5, 1991

[54] TORQUE TRANSMITTING DEVICE

[75] Inventors: Kazuhiko Shimada; Katsuhiko Masuda; Tetsurou Hamada; Kunitaka Furuya; Kazunori Shibuya, all of Saitama, Japan

[73] Assignee: Honda Giken Kogyo Kabushiki Kaisha, Tokyo, Japan

[21] Appl. No.: 136,405

[22] Filed: Dec. 21, 1987

[30] Foreign Application Priority Data

Dec. 24, 1986 [JP] Japan ................................ 61-313806

[51] Int. Cl.⁵ .............................................. F16H 35/04
[52] U.S. Cl. .................................. 74/650; 192/70.12; 192/58 B
[58] Field of Search ............... 192/58 B, 58 R, 49, 192/70.12, 58 C; 74/650, 711

[56] References Cited

U.S. PATENT DOCUMENTS

| | | | |
|---|---|---|---|
| 1,746,148 | 2/1930 | Eaton | 60/364 |
| 2,514,137 | 4/1950 | O'Connor | 188/90 |
| 3,648,811 | 3/1972 | La Flame | 192/58 B |
| 3,760,922 | 9/1973 | Rolt et al. | 74/710.5 X |
| 3,869,940 | 3/1975 | Webb et al. | 74/711 |
| 4,280,609 | 7/1981 | Cruise | 192/70.12 X |
| 4,358,001 | 11/1982 | Iverson | 192/70.12 X |
| 4,650,028 | 3/1987 | Eastman et al. | 192/49 X |

FOREIGN PATENT DOCUMENTS

| | | | |
|---|---|---|---|
| 68309 | 1/1983 | European Pat. Off. | |
| 236650 | 9/1987 | European Pat. Off. | 74/711 |
| 3630981A | 3/1987 | Fed. Rep. of Germany | |
| 57-154522 | 9/1982 | Japan | 192/70.12 |
| 58-50349 | 3/1983 | Japan | |
| 62-98033 | 5/1987 | Japan | 192/58 B |
| 61-282647 | 5/1987 | Japan | |
| 1357106 | 6/1974 | United Kingdom | |
| 1411283 | 10/1975 | United Kingdom | |
| 1498061 | 1/1978 | United Kingdom | |
| 1579157 | 11/1980 | United Kingdom | |
| 2160624 | 12/1985 | United Kingdom | 192/58 B |
| 2175056 | 11/1986 | United Kingdom | |
| 2182122 | 5/1987 | United Kingdom | |

Primary Examiner—Dwight Diehl
Assistant Examiner—Chris Campbell
Attorney, Agent, or Firm—Rosen, Dainow & Jacobs

[57] ABSTRACT

A torque transmitting device for transmitting torque by utilizing the viscosity of a fluid includes a casing having a cylindrical barrel having closed opposite ends, shafts rotatably supported in the casing in concentric relation to the cylindrical barrel, a fluid chamber defined by an inner peripheral surface and outer peripheral surfaces of the shafts, a plurality of annular outer plates disposed in the fluid chamber and rotatable with the casing, a plurality of annular inner plates disposed in the fluid chamber alternately with the outer plates and rotatable with the shafts, and a fluid filled in the fluid chamber. Torque can be transmitted between the casing and the shafts through the viscosity of the fluid present between the outer plates and the inner plates. Flow passages are defined in the fluid chamber and extending axially of the shafts for allowing the fluid to flow in the fluid chamber axially of the shafts.

21 Claims, 5 Drawing Sheets

TORQUE TRANSMITTING DEVICE

BACKGROUND OF THE INVENTION

1. Field of the Invention

The present invention relates to a torque transmitting device for transmitting torque by utilizing the viscosity of a fluid.

2. Description of the Relevant Art

Viscous shear couplings are known as a device for transmitting torque by utilizing the viscosity of a fluid. The viscous shear couplings generally comprise a casing having a cylindrical barrel, a shaft rotatably supported in the casing in concentric relation to the barrel, a fluid chamber defined between the inner surface of the casing and the peripheral surface of the shaft, a plurality of outer plates rotatable in the fluid chamber in unison with the casing, a plurality of inner plates disposed in the fluid chamber alternately with the outer plates and rotatable with the shaft, and a highly viscous fluid filled in the fluid chamber.

The viscous shear coupling is widely used for connecting two coaxial shafts to each other and in differentials and the like. Japanese Laid-Open Patent Publication No. 58-50349 (British Patent Application No. 8119769) discloses such a viscous shear coupling incorporated in an automotive differential.

When transmitting torque with a viscous shear coupling, the temperature of the fluid rises since torque transmission relies upon the viscous resistance developed when the outer and inner plates shear the fluid present therebetween. If the fluid flows in the fluid chamber by circulation or convection, localized temperature increases of the fluid are prevented and hence the fluid has increased durability for maintaining desired torque transmission characteristics. With the conventional coupling structure described above, however, the outer peripheries of the outer plates are fitted in the inner peripheral surface of the casing, and the alternate outer and inner plates are closely positioned. For the fluid to flow in the fluid chamber, the fluid has to pass through a narrow labyrinth defined by the outer plates, the inner plates, and the casing. Therefore, the fluid cannot smoothly circulate by convection, with the result that an unwanted localized temperature rise of the fluid cannot be prevented effectively.

Since the flow path in the fluid chamber is labyrinths, the fluid cannot quickly be supplied into and discharged from the fluid chamber during assembling or servicing the fluid chamber. Moreover, inasmuch as the fluid chamber is filled with air before being filled with fluid a small amount of air may be trapped therein, during filling which, cannot quickly be purged.

Where the viscous shear coupling is combined with an automotive differential as disclosed in British Patent No. 8119769, if only one of the lateral axles rotates differentially with respect to the casing of the coupling, then only the temperature of fluid present near that axle may rise. This may develop different torque transmission characteristics for the axles during usage over a long period of time.

SUMMARY OF THE INVENTION

In view of the above difficulties with the conventional viscous shear coupling described above, it is an object of the present invention to provide a torque transmitting device which includes a casing filled with a fluid of increased durability, allows the fluid to be supplied and discharged with ease when the device is assembled and serviced, and maintains proper characteristics of torque transmission from the casing to two output shafts particularly where the device is incorporated in a differential.

According to the present invention, there is provided a torque transmitting device comprising: a casing having a cylindrical barrel having closed opposite ends; shafts rotatably supported in the casing in concentric relation to the cylindrical barrel; a fluid chamber defined by an inner peripheral surface of the housing and outer peripheral surfaces of the shafts; a plurality of annular outer plates disposed in the fluid chamber and rotatable with the casing; a plurality of annular inner plates disposed in the fluid chamber alternately with the outer plates and rotatable with the shafts; a fluid filled in the fluid chamber; whereby torque can be transmitted between the casing and the shafts through the viscosity of the fluid present between the outer plates and the inner plates; and flow passages defined in the fluid chamber and extending axially of the shafts for allowing the fluid to flow in the fluid chamber axially of the shafts.

The above and further objects, details and advantages of the present invention will become apparent from the following detailed description of preferred embodiments thereof, when read in conjunction with the accompanying drawings.

DETAILED DESCRIPTION OF THE PREFERRED EMBODIMENTS

Figure 1:
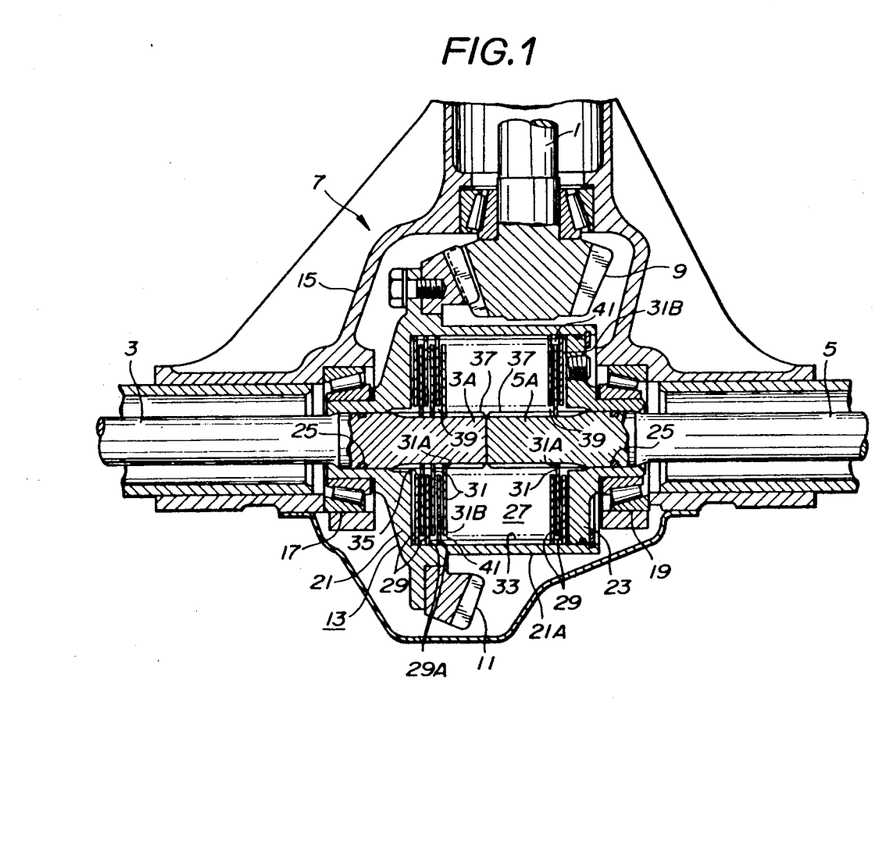
FIG. 1 is a cross-sectional view of a torque transmitting device according to the present invention, as incorporated in an automotive differential.

As shown in FIG. 1, a drive shaft 1 is operatively coupled to the output shaft of an engine (not shown), and two lateral axles 3, 5 are disposed coaxially with each other and connected to respective drive wheels (not shown). The drive shaft 1 and the axles 3, 5 are operatively connected to each other by means of a torque transmitting device 7 which serves to transmit torque from the drive shaft 1 to the axles 3, 5.

The torque transmitting device 7 has a casing 13 rotatably supported by bearings 17, 19 in a housing 15 mounted on a vehicle frame (not shown). A bevel gear 11 mounted on an outer peripheral surface of the casing 13 is held in mesh with a bevel gear 9 fixed to the drive shaft 1, so that the casing 13 can be rotated in response to rotation of the drive shaft 1.

The casing 13 comprises a casing body 21 including a cylindrical barrel 21A having a closed end, and a cover 23 fitted in an open end of the barrel 21A. The axles 3, 5 have respective ends 3A, 5A disposed in the casing 13 with respective seals 25 therebetween, the ends 3A, 5A being concentric with the cylindrical barrel 21A and held in abutment against each other.

A fluid chamber 27 is defined between the inner surface of the casing 13 and peripheral surfaces of the axles 3, 5. The fluid chamber 27 accommodates therein a plurality of outer plates 29 and a plurality of inner plates 31, the outer and inner plates 29, 31 being disposed alternately with and adjacent to each other. The fluid chamber 27 is filled with a highly viscous fluid such as silicone oil.

Each of the outer plates 29 is of an annular shape having a central insertion hole 35 and teeth 29A on its outer peripheral edge. The teeth 29A are fitted respectively in splines 33 defined in the inner peripheral surface of the casing barrel 21A. The axle ends 3A and 5A with splines 37 defined in the outer peripheral surface thereof are inserted through the insertion hole 35. An annular gap 39 is defined between the edge of the insertion hole 35 and the surfaces of the splines 37 of the axle ends 3A and 5A.

Each of the inner plates 31 is of an annular shape having teeth 31A on its inner peripheral edge. The teeth 31A are fitted respectively in the splines 37 defined in the outer peripheral surface of the axle ends 3A and 5A. An annular gap 41 is defined between the outer peripheral surface 31B of the inner plate 31 and the surfaces of the splines 33.

Figure 2:
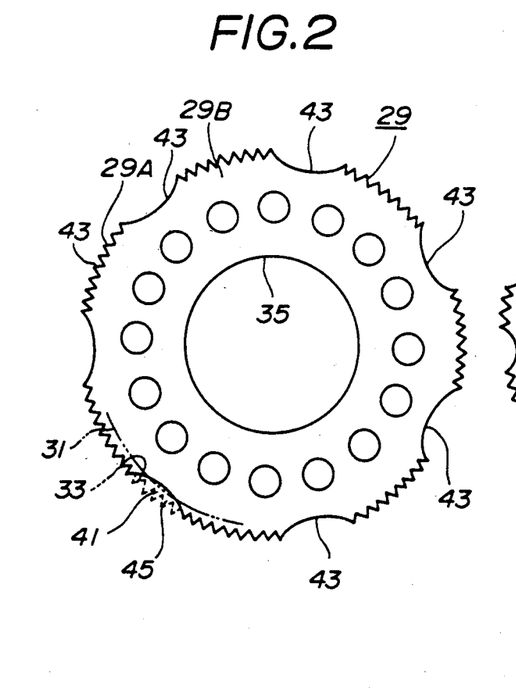
FIG. 2 is a front elevational view of an outer plate of the torque transmitting device of FIG. 1 according to a first embodiment.

According to a first embodiment, as shown in FIG. 2, the outer peripheral edge 29B of each outer plate 29 including the teeth 29A has a plurality of circumferentially equally spaced recesses 43 which are arcuate in shape. As indicated by the imaginary line in FIG. 2, a plurality of flow passages 45 are defined in the fluid chamber 27 by the recesses 43 and the gap 41 in an outer peripheral portion of the fluid chamber 27, the flow passages 45 extending longitudinally of the casing 13, i.e., axially of the axles 3, 5.

In the first embodiment, therefore, when the temperature of the fluid in the fluid chamber 27 rises upon torque transmission, the fluid is allowed to circulate through the flow passages 45 for convection in the fluid chamber 27. Therefore, any undesired localized temperature increase is reduced or eliminated in the fluid chamber 27, and the fluid has increased durability.

When only one of the axles 3, 5 rotates differentially with respect to the casing 13, the fluid close to said one axle is increased in temperature and expanded. The expanded fluid is then permitted to flow through the flow passages 45 by circulation or convection in the entire fluid chamber 27. Therefore, even when the torque transmitting device is used for a long period of time, the characteristics of torque transmission to the axles 3, 5 remain equal.

Since the flow passages 45 extend axially of the axles 3, 5, the fluid can easily and quickly be supplied and discharged when the torque transmission device 7 is assembled or serviced, and purging, if necessary can quickly be accomplished as fluid is supplied to the fluid chamber 27. Consequently, maintenance of the torque transmitting device 7 can efficiently be effected.

The size of the recesses 43 depends upon the viscosity of the fluid used, but their area should preferably be in the range of from 5% to 15% of the area of the outer plate 29. The number of the recesses 43 is preferably a divisor of the number of the outer teeth 29A for easy assembly.

Figure 3:
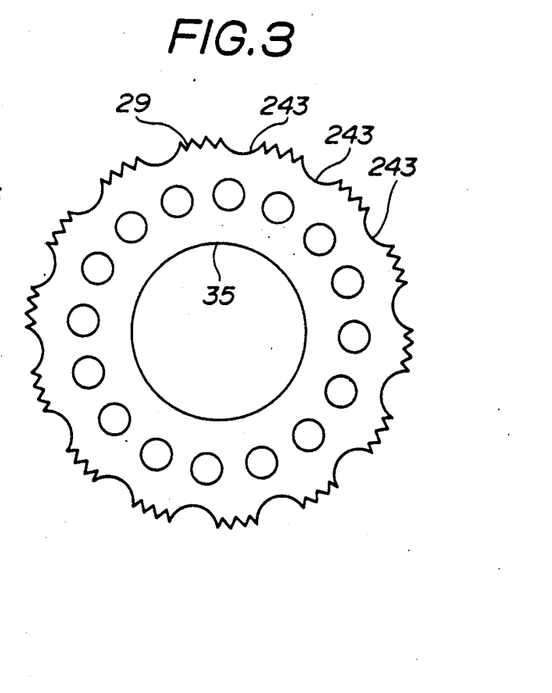
FIG. 3 is a front elevational view of an outer plate of the torque transmitting device of FIG. 1 according to a second embodiment.

FIG. 3 shows an outer plate according to a second embodiment of the present invention.

According to the second embodiment, recesses 243 are smaller in size than the recesses 43 of the first embodiment, and the number of the recesses 243 is larger than the number of the recesses 43 of the first embodiment.

A third embodiment of the present invention will be described with reference to FIG. 4.

Figure 4:
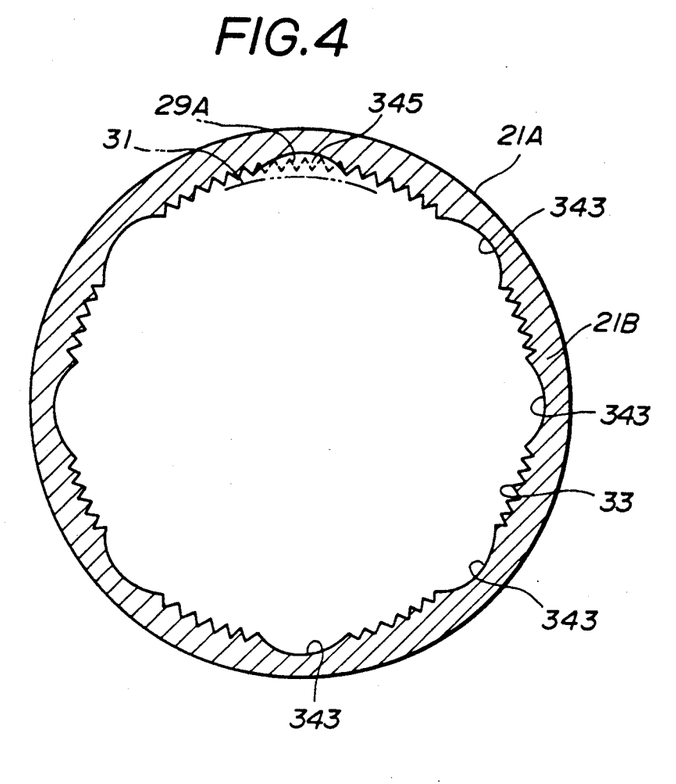
FIG. 4 is a cross-sectional view of a casing barrel of the torque transmitting device of FIG. 1 according to a third embodiment.

FIG. 4 shows in cross section the barrel 21A of the casing body 21.

The inner peripheral surface 21B of the casing barrel 21A including the splines 33 has a plurality of circumferentially spaced grooves 343 extending axially of the axles 3, 5. As indicated by the imaginary line in FIG. 4, the grooves 343 define flow passages 345 extending axially of the axles 3, 5.

Operation and advantages of the third embodiment are the same as those of the first embodiment. The cross-sectional area of the grooves 343 should preferably be in the range of from 5% to 15% of the area of the outer plate 29.

It is possible to combine the first and third embodiments. In this modification, the sum of the area of the recesses 43 and the cross-sectional area of the grooves 343 should preferably be in the range of from 5% to 15% of the area of the outer plate 29.

Figure 5:
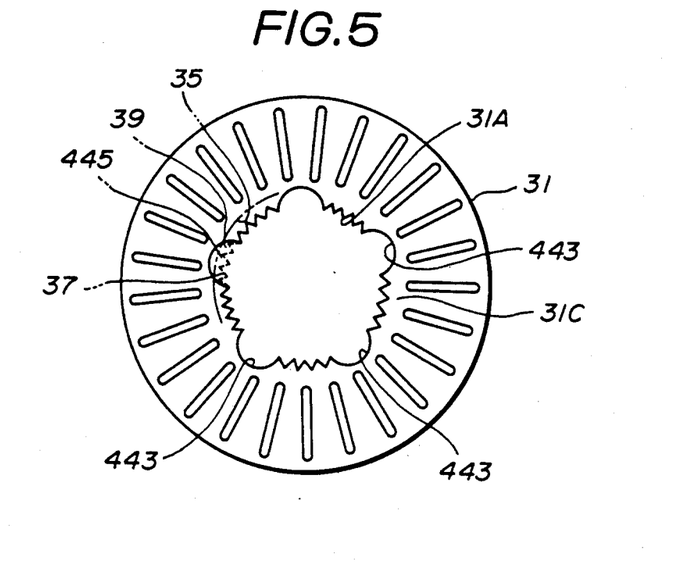
FIG. 5 is a front elevational view of an inner plate of the torque transmitting device of FIG. 1 according to a fourth embodiment.

FIG. 5 illustrates a fourth embodiment of the present invention.

According to the fourth embodiment, the inner peripheral surface 31C of each inner plate 31 including the inner teeth 31A has circumferentially spaced recesses 443. As indicated by the imaginary line in FIG. 5, the recesses 443 and the gap 39 jointly define flow passages 445 extending in the axial direction of the axles 3, 5. Operation and advantages of the fourth embodiment are the same as those of the first embodiment.

The area of the grooves 443 should preferably be in the range of from 5% to 15% of the area of the inner plate 31.

A fifth embodiment of the present invention will be described with reference to FIG. 6.

Figure 6:
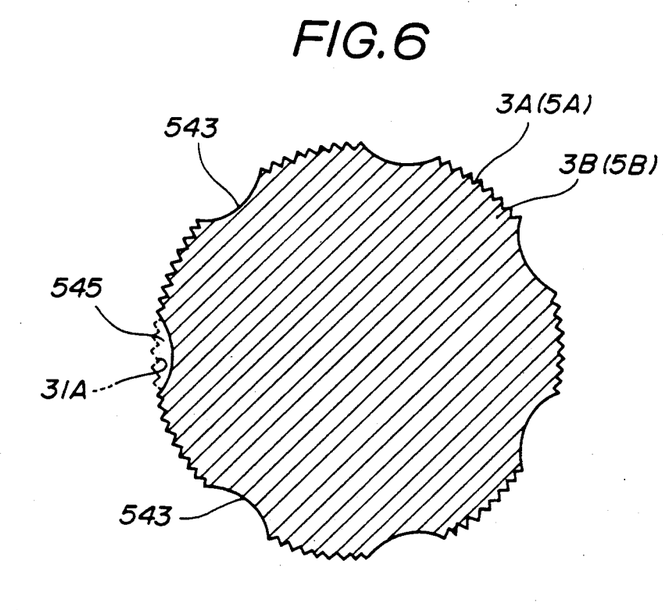
FIG. 6 is a cross-sectional view of an axle end of the torque transmitting device of FIG. 1 according to a fifth embodiment.

FIG. 6 shows in cross section the axle end 3A (5A).

In the fifth embodiment, the outer peripheral surface 3B (5B) of the axle end 3A (5A) including the splines 37 (not shown in FIG. 6) has a plurality of circumferentially spaced grooves 543 extending axially of the axles 3, 5. As indicated by the imaginary line in FIG. 6, the grooves 543 define flow passages 545. The cross-sectional area of the grooves 543 should preferably be of the same ratio as that of the first embodiment.

Where the fourth and fifth embodiments are combined, the sum of the area of the recesses 443 and the cross-sectional area of the grooves 543 should preferably be in the range of from 5% to 15% of the area of the inner plate 31.

A sixth embodiment of the present invention will be described with reference to FIG. 7.

Figure 7:
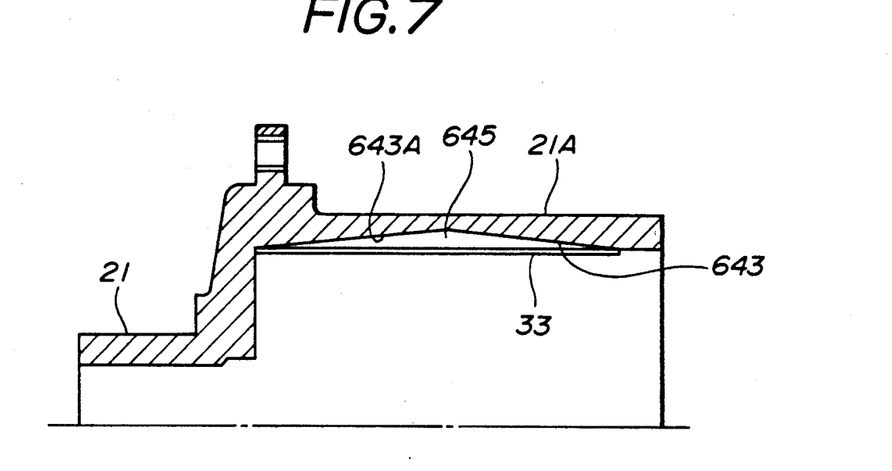
FIG. 7 is a fragmentary cross-sectional view of a casing body of the torque transmitting device of FIG. 1 according to a sixth embodiment.

FIG. 7 shows in cross section a half of a casing body.

The inner peripheral surface 21B (not referenced in FIG. 7) of the casing barrel 21A has a plurality of circumferentially spaced grooves 643 extending axially of the axles 3, 5. The grooves 643 have bottom surfaces that are deepest at their longitudinally central areas and progressively tapered or more shallow toward their opposite ends. The grooves 643 define flow passages 645.

In addition to the advantages offered by the first embodiment, the sixth embodiment has another advantage in that the fluid can be forced to flow toward the center of the fluid chamber 27 for circulation therein under centrifugal forces produced upon rotation of the casing 13.

A seventh embodiment of the present invention will be described with reference to FIG. 8.

Figure 8:
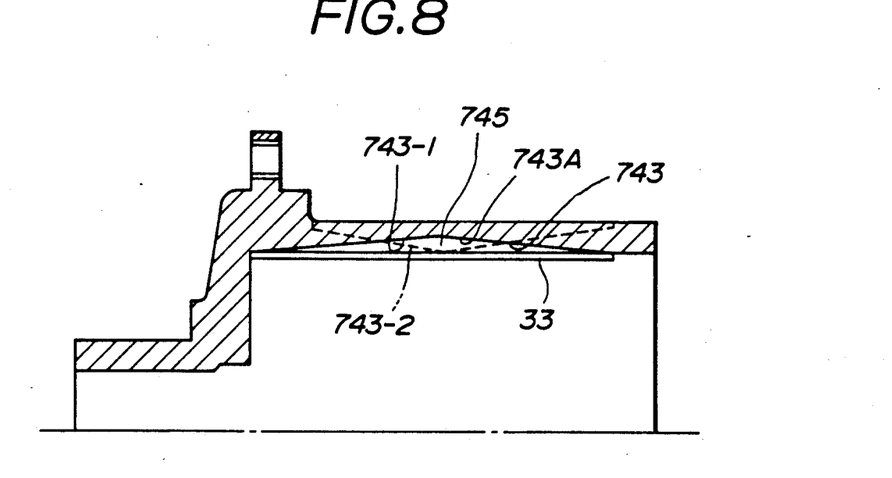
FIG. 8 is a fragmentary cross-sectional view of a casing body of the torque transmitting device of FIG. 1 according to a seventh embodiment.

FIG. 8 shows in cross section a half of a casing body.

The inner peripheral surface 21B (not referenced in FIG. 8) of the casing barrel 21A (not referenced in FIG. 8) has a plurality of circumferentially spaced grooves 743 extending axially of the axles 3, 5. The grooves 743 include grooves 743-1 which have bottom surfaces that are deepest at their longitudinally central areas and progressively more shallow toward the opposite ends thereof, and grooves 743-2 which have bottom surfaces that are most shallow at their longitudinally central areas and progressively deeper toward the opposite ends thereof, the grooves 743-1, 743-2 being alternately positioned. The grooves 743 define flow passages 745.

In addition to the advantages offered by the first embodiment, the seventh embodiment has another advantage in that the fluid can be forced to flow in the fluid chamber 27 toward the longitudinal central areas and opposite ends of the grooves.

Figure 9:
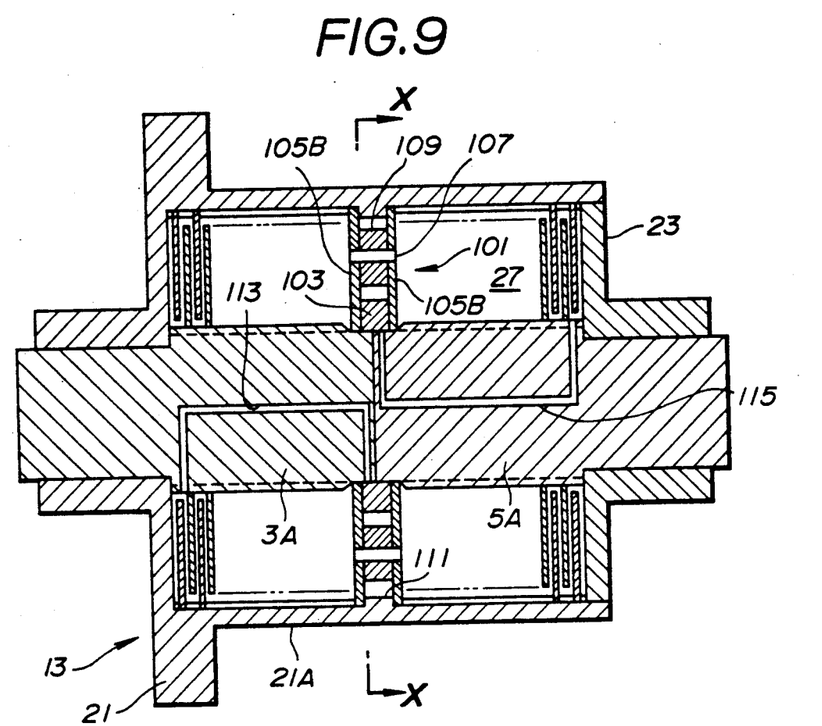
FIG. 9 is a cross-sectional view of a torque transmitting device according to an eighth embodiment.
Figure 10:
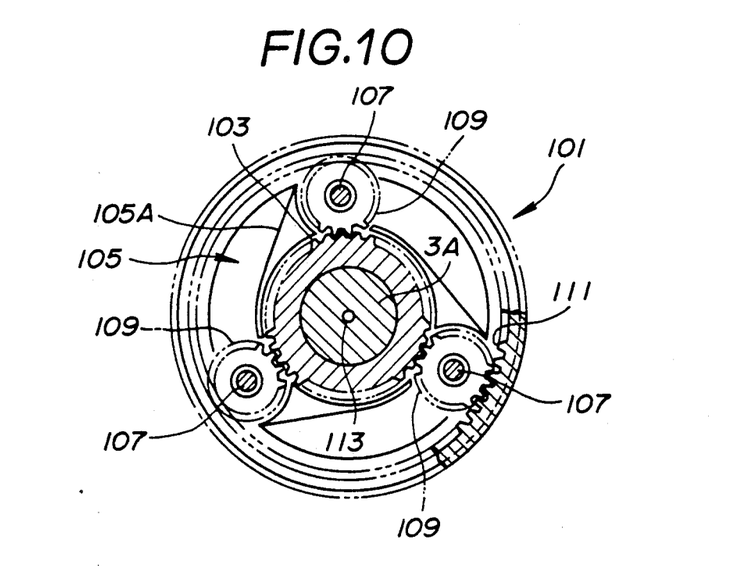
FIG. 10 is a cross-sectional view taken along line X—X of FIG. 9.

An eighth embodiment of the present invention will be described with reference to FIGS. 9 and 10.

According to the eighth embodiment, in addition to the flow passages according to the first through seventh embodiments, a gear pump 101 is disposed in the fluid chamber 27 for forcibly circulating the fluid in the fluid chamber 27.

The gear pump 101 comprises a sun gear 103 fixed to the end of the axle 5A and rotatable with the axle 5A, a carrier 105 having a substantially triangular guide region 105A and support plates 105B sandwiching the guide region 105A, three planet gears 109 rotatably supported on shafts 107 mounted on the support plates 105B and meshing with the sun gear 103, and a ring gear 111 formed on the inner peripheral surface of the casing barrel 21A and meshing with the planet gears 109.

The inner periphery of the sun gear 103 is rotatably fitted over the end of the axle shaft 3A. The outer ends of the support plates 105B are guided by the opposite sides of the ring gear 111. The support plates 105B have recesses (not shown) defined in outer peripheral edges thereof for passage of the fluid therethrough. The axles 3A, 5A have oil passages 113, 115, respectively, extending from the outer periphery of the sun gear 103 to the opposite ends of the fluid chamber 27.

The pump 101 is driven by differential rotation between the casing 13 and the axle 5A for forcibly sending the fluid from the central area of the fluid chamber 27 to the opposite ends thereof via the oil passages 113, 115.

Therefore, the fluid is forcibly circulated in the fluid chamber 27 by the pump 101, the oil passages 113, 115, and the flow passages described above with reference to the previous embodiments.

In the first through eighth embodiments, the present invention is applied to a differential. However, the present invention is also applicable to a device for connecting two coaxial shafts to each other. In this alternative, one of the shafts is coupled to the casing and the other shaft has its end disposed in the fluid chamber of the casing.

With the arrangement of the present invention, as described above, the fluid can easily flow in the fluid chamber through the flow passages defined therein by circulation or convection in the fluid chamber. Therefore, the fluid is prevented from being subjected to a localized temperature rise, and has an increased degree of durability.

When the torque transmitting device is assembled or serviced, the fluid can quickly be supplied and discharged. The fluid can also be corrected out of a biased or one-sided condition quickly when the fluid is supplied to the fluid chamber.

Where the torque transmitting device is incorporated in a differential, since the fluid can flow in the fluid chamber, the viscosity and other properties of the fluid are uniform in the fluid chamber at all times, and the characteristics of torque transmission to the two output shafts remain equal over a long period of time.

Although there have been described what are at present considered to be the preferred embodiments of the present invention, it will be understood that the invention may be embodied in other specific forms without departing from the spirit or essential characteristics thereof. The present embodiments are therefore to be considered in all aspects as illustrative, and not restrictive. The scope of the invention is indicated by the appended claims rather than by the foregoing description.

We claim:

1. A torque transmitting device comprising:
   a casing having a cylindrical barrel with a plurality of teeth defined at inner peripheral surface thereof and closed opposite ends;
   shafts rotatably supported in said casing in concentric relation to said cylindrical barrel;
   a fluid chamber defined by an inner peripheral surface of said casing and outer peripheral surfaces of said shafts;
   a plurality of annular outer plates disposed in said fluid chamber and rotatable with said casing, said outer plates having a plurality of teeth in mesh with said teeth defined at the cylindrical barrel;
   a plurality of annular inner plates disposed in said fluid chamber alternately with said outer plates and rotatable with said shafts;
   a fluid having high viscosity and filled and sealed in said fluid chamber;
   whereby torque can be transmitted between said casing and said shaft through the viscosity of the fluid present between said outer plates and said inner plates; and
   flow passages defined in said fluid chamber and extending axially of said shaft from one end to the other end of said fluid chamber irrespective of the relative rotation of said outer plates and inner plates for allowing the fluid to flow for circulation or convection in said fluid chamber, said flow passages being defined between said inner peripheral surface of the casing barrel and outer peripheries of said outer plates and each of said flow passages being formed over a plurality of teeth defined at said casing barrel.

2. A torque transmitting device according to claim 1, wherein said outer plates each have a circumference and have a plurality of recesses defined in the outer peripheries thereof, said flow passages being defined by said casing barrel and said recesses.

3. A torque transmitting device according to claim 2, wherein said recesses are equally spaced in the circumferential direction of said outer plates.

4. A torque transmitting device according to claim 2, wherein said recesses are arcuate in shape.

5. A torque transmitting device according to claim 1, wherein said casing barrel has an inner periphery thereon and has a plurality of grooves defined in the inner periphery thereof, said flow passages being defined by said grooves and the outer peripheries of said outer plates.

6. A torque transmitting device according to claim 5, wherein said grooves are deepest at central areas thereof and progressively more shallow toward opposite ends thereof.

7. A torque transmitting device according to claim 6, wherein said grooves include grooves that are deepest at central areas thereof and progressively more shallow toward opposite ends thereof, and grooves that are most shallow at central areas thereof and progressively deeper toward opposite ends thereof.

8. A torque transmitting device according to claim 1, wherein said flow passages are defined between peripheral surfaces of said shafts and inner peripheries of said inner plates.

9. A torque transmitting device according to claim 8, wherein said inner plates have a plurality of recesses defined in the inner peripheries thereof, said flow passages being defined by the peripheral surfaces of said shafts and said recesses.

10. A torque transmitting device according to claim 8, wherein said shafts have a plurality of grooves extending axially thereof, said flow passages being defined by said grooves and the inner peripheries of said inner plates.

11. A torque transmitting device according to claim 1, further including a gear pump, said gear pump comprising a sun gear rotatable with said shafts, a ring gear integrally formed with said casing, a plurality of planet gears disposed between and meshing with said sun gear and said ring gear, and a carrier supporting said planet gears.

12. A torque transmitting device according to claim 11, wherein said gear pump is disposed centrally in said fluid chamber, said shafts having flow passages communicating between central and opposite areas of said fluid chamber.

13. A torque transmitting device according to claim 1, wherein said flow passages include outer flow passages defined in part by the outer peripheries of said outer plates and inner flow passages defined in part by the inner peripheries of said inner plates.

14. A torque transmitting device comprising:
a casing having a cylindrical barrel with a plurality of teeth defined at inner peripheral surface thereof and closed opposite ends;
shafts rotatably supported in said casing in concentric relation to said cylindrical barrel;
a fluid chamber defined by an inner peripheral surface of said casing and outer peripheral surfaces of said shafts;
a plurality of annular outer plates disposed in said fluid chamber and rotatable with said casing, said outer plates having a plurality of teeth in mesh with said teeth defined at the cylindrical barrel;
a plurality of annular inner plates disposed in said fluid chamber alternately with said outer plates and rotatable with said shafts;
a fluid having high viscosity and filled and sealed in said fluid chamber;
whereby torque can be transmitted between said casing and said shafts through the viscosity of the fluid present between said outer plates and said inner plates; and
flow passages defined in said fluid chamber and extending axially of said shaft from one end to the other end of said fluid chamber irrespective of the relative rotation of said outer plates and inner plates for allowing the fluid to flow for circulation or convection in said fluid chamber, said flow passages being defined between said inner peripheral surface of the casing barrel and outer peripheries of said outer plates and each of said flow passages being formed over a plurality of teeth defined at said outer plates.

15. A torque transmitting device according to claim 14, wherein said outer plates each have a circumference and a plurality of recesses defined in the outer peripheries thereof, said flow passages being defined by said casing barrel and said recesses.

16. A torque transmitting device according to claim 15, wherein said recesses are equally spaced in the circumferential direction of said outer plates.

17. A torque transmitting device according to claim 15, wherein said recesses are arcuate in shape.

18. A torque transmitting device according to claim 14, wherein said casing barrel has an inner periphery thereon and has a plurality of grooves defined in the inner periphery thereof, said flow passages being defined by said grooves and the outer peripheries of said outer plates.

19. A torque transmitting device according to claim 14, wherein said flow passages include outer flow passages defined in part by the outer peripheries of said outer plates and inner flow passages defined in part by the inner peripheries of said inner plates.

20. A torque transmitting device comprising:
a casing having a cylindrical barrel having an inner periphery thereon and has a plurality of grooves defined in the inner periphery thereof said grooves being deepest at central areas thereof and progressively more shallow toward opposite ends thereof, and closed opposite ends;
shafts rotatably supported in said casing in concentric relation to said cylindrical barrel;
a fluid chamber defined by an inner peripheral surface of said casing and outer peripheral surfaces of said shafts;
a plurality of annular outer plates disposed in said fluid chamber and rotatable with said casing;
a plurality of annular inner plates disposed in said fluid chamber alternately with said outer plates and rotatable with said shafts;
a fluid having viscosity filled in said fluid chamber;
whereby torque can be transmitted between said casing and said shafts through the viscosity of the fluid present between said outer plates and said inner plates; and flow passages defined in said fluid chamber and extending axially of said shafts from one end to the other end of said fluid chamber irrespective of the relative rotation of said outer and inner plates for allowing the fluid to flow in said fluid chamber axially of said shafts, said flow passages being defined by said grooves and the outer peripheries of said outer plates.

21. A torque transmitting device according to claim 20, wherein said grooves include grooves that are deepest at central areas thereof and progressively more shallow toward opposite ends thereof, and grooves that are most shallow at central areas thereof and progressively deeper toward opposite ends thereof.

* * * * *